G. W. HORMEL.
STOVEPIPE LOCK.
APPLICATION FILED JULY 7, 1919.

1,345,778.

Patented July 6, 1920.
2 SHEETS—SHEET 1.

WITNESSES

INVENTOR
G. W. HORMEL,
BY
ATTORNEYS

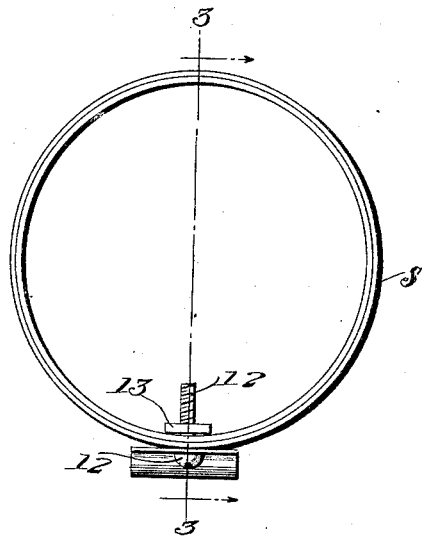
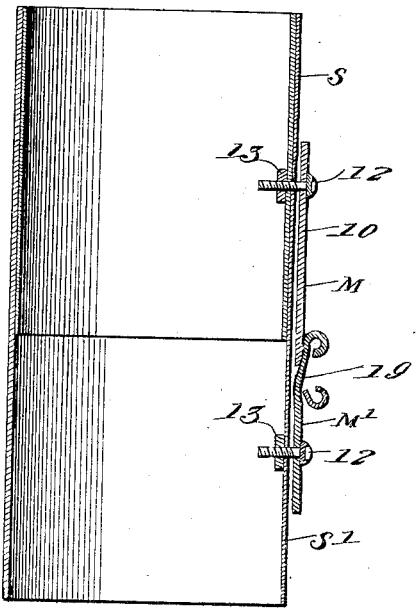
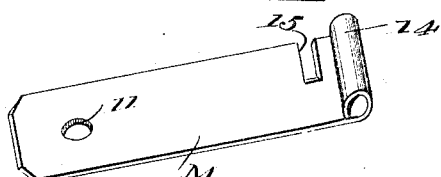

UNITED STATES PATENT OFFICE.

GEORGE WASHINGTON HORMEL, OF WICHITA, KANSAS, ASSIGNOR TO GEORGE McCONNELL GLENN, OF WICHITA, KANSAS.

STOVEPIPE-LOCK.

1,345,778.　　　　Specification of Letters Patent.　　Patented July 6, 1920.

Application filed July 7, 1919. Serial No. 308,990.

*To all whom it may concern:*

Be it known that I, GEORGE WASHINGTON HORMEL, a citizen of the United States, and a resident of Wichita, in the county of Sedgwick and State of Kansas, have made certain new and useful Improvements in Stovepipe-Locks, of which the following is a specification.

My invention relates to a stove pipe lock for securing lengths of stove pipe together, and an object of the invention is to provide a simple and effective lock for positively uniting the meeting ends of adjoining stove pipe sections.

I will describe one form of stove pipe lock embodying my invention and will then point out the novel features in claims.

In the accompanying drawings:

Fig. 2 is a top plan view of Fig. 1;

Fig. 3 is a vertical sectional view taken on the line 3—3 of Fig. 2;

Figs. 4 and 5 are detailed perspective views of the two locking members shown in the preceding views.

Similar reference characters refer to similar parts in each of the several views.

Figure 1:
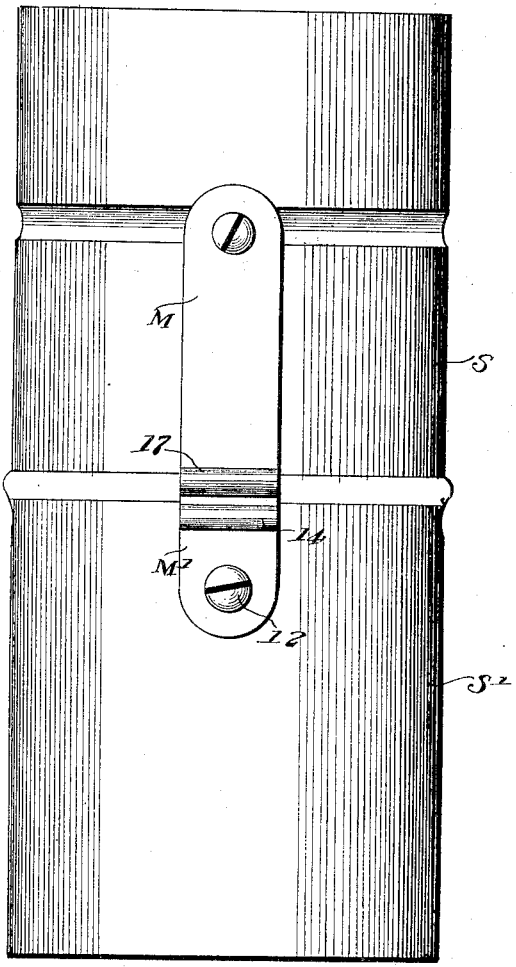
Figure 1 is a view showing in side elevation two sections of stove pipe having applied thereto one form of lock embodying my invention.
Figure 5:
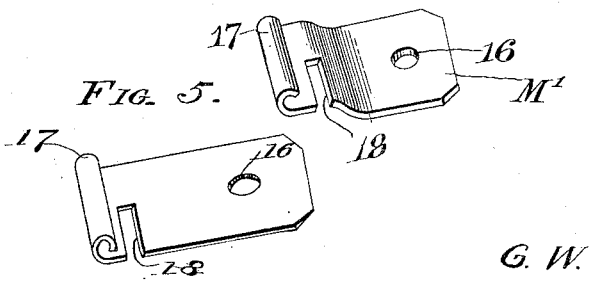

Referring specifically to the drawings, my stove pipe lock comprises coacting locking members M and M', which are connected to the confronting ends of a pair of stove pipe sections S and S', so as to extend across the joint when in locking position. The locking member M comprises a metallic plate 10 provided with an opening 11, for receiving a screw 12 which extends through a suitable opening in the pipe section S and is secured therein by means of a nut 13. The free end of the locking member M is bent upon itself to provide an actuating handle 14, and adjacent this handle one edge of the plate is recessed as at 15. The locking member M' is attached to the section S' in the same manner as the locking member M, such member M' being provided with an opening 16 to receive the screw 12. The free end of the member M' is also bent upon itself to provide an operating handle 17 and adjacent this handle one edge of the plate is recessed as at 18.

In practice, the locking member M' is rigidly secured to the corresponding pipe-section S', while the other locking member M is mounted for swinging movement about its respective screw 12. With the locking members in proper position upon the pipe sections, the recess 15 is arranged in opposed relation to the recess 18 so that when the movable locking member M is swung into alinement with the stationary locking member M' the recessed portions permit the members to overlap, as shown in Fig. 3.

To temporarily lock the members in alined position to effect a secure locking of the stove pipe sections, the member M' is bent outwardly to such a degree that in locking position this bent portion will frictionally engage the locking member M to hold the latter against accidental displacement. It is obvious that the unlocking of the members M and M' is easily effected by swinging the movable locking member out of engagement with the stationary member.

Although I have herein shown and described only one form of stove pipe lock embodying my invention, it is to be understood that various changes and modifications may be made herein without departing from the spirit of the invention and the spirit and scope of the appended claims.

Having described my invention, what I claim is:

1. A stove pipe lock, comprising a stationary member and a movable member, and coacting means carried by the members for frictionally locking the movable member against movement when the members are in alined position.

2. A lock for stove pipe joints, comprising a plate adapted to be rigidly secured to a stove pipe section, and a second plate adapted to be pivotally secured to an adjacent stove pipe section, said plates being formed with recesses in the confronting edges thereof and having their free ends bent upon themselves to provide operating handles, one of the plates being inclined outwardly from the recess to the free end thereof for the purpose described.

3. A lock for stove pipe joints comprising, a plate adapted to be rigidly secured to a stove pipe section, and a second plate adapted to be pivotally secured to an adjacent stove pipe section, said plates being formed with recesses to permit interfitting of the plates so as to frictionally engage each other when in alined position.

GEORGE WASHINGTON HORMEL.